United States Patent [19]

Merickel

[11] Patent Number: 5,325,622

[45] Date of Patent: Jul. 5, 1994

[54] BIRD TRAP ASSEMBLY

[76] Inventor: Dwain H. Merickel, R.R. 1-Box 69, Elysian, Minn. 56028

[21] Appl. No.: 66,766

[22] Filed: May 25, 1993

[51] Int. Cl.$^5$ .................................. A01M 23/08
[52] U.S. Cl. ................................ 43/66; 43/61; 119/50; 119/23
[58] Field of Search ............ 43/60, 61, 66, 73; 119/49, 50, 23; D30/110, 111

[56] References Cited

U.S. PATENT DOCUMENTS

| | | | |
|---|---|---|---|
| 147,899 | 2/1874 | Carnahan | 43/66 |
| 1,074,916 | 10/1913 | Wiesen | 43/65 |
| 1,243,008 | 10/1917 | Taylor | 43/61 |
| 1,363,626 | 12/1920 | Thomas | 43/66 |
| 1,506,045 | 8/1924 | Boyer | 43/65 |
| 1,683,423 | 9/1928 | Strickland | 119/50 |
| 2,897,627 | 8/1959 | Neid | 43/65 |
| 2,995,861 | 8/1961 | Osborn | 43/66 |
| 3,393,468 | 7/1968 | Wood et al. | 43/66 |
| 3,778,922 | 12/1973 | Clark | 43/61 |
| 4,291,486 | 9/1981 | Lindley | 43/61 |
| 4,471,721 | 9/1984 | Vail | 43/61 |
| 4,757,638 | 7/1988 | Lafforthun | 43/66 |
| 4,768,466 | 9/1988 | Burns et al. | 119/23 |
| 4,779,373 | 10/1988 | Krenson | 43/66 |
| 4,787,170 | 11/1988 | Kingsbury et al. | 43/61 |

FOREIGN PATENT DOCUMENTS

| | | | |
|---|---|---|---|
| 491136 | 4/1889 | Fed. Rep. of Germany | 43/66 |
| 562244 | 10/1932 | Fed. Rep. of Germany | 43/61 |

Primary Examiner—P. Austin Bradley
Assistant Examiner—Jeanne M. Elpel
Attorney, Agent, or Firm—Kinney & Lange

[57] ABSTRACT

A trap assembly for trapping birds which have natural instinct to nest or roost in dark places is provided. The trap assembly comprises a housing having a closed end and an open end. A darkened area within the housing entices the birds to enter the housing through the open end. A trap mechanism immediately adjacent the open end traps the birds within the housing thereby preventing the birds from exiting the housing via the open end.

12 Claims, 2 Drawing Sheets

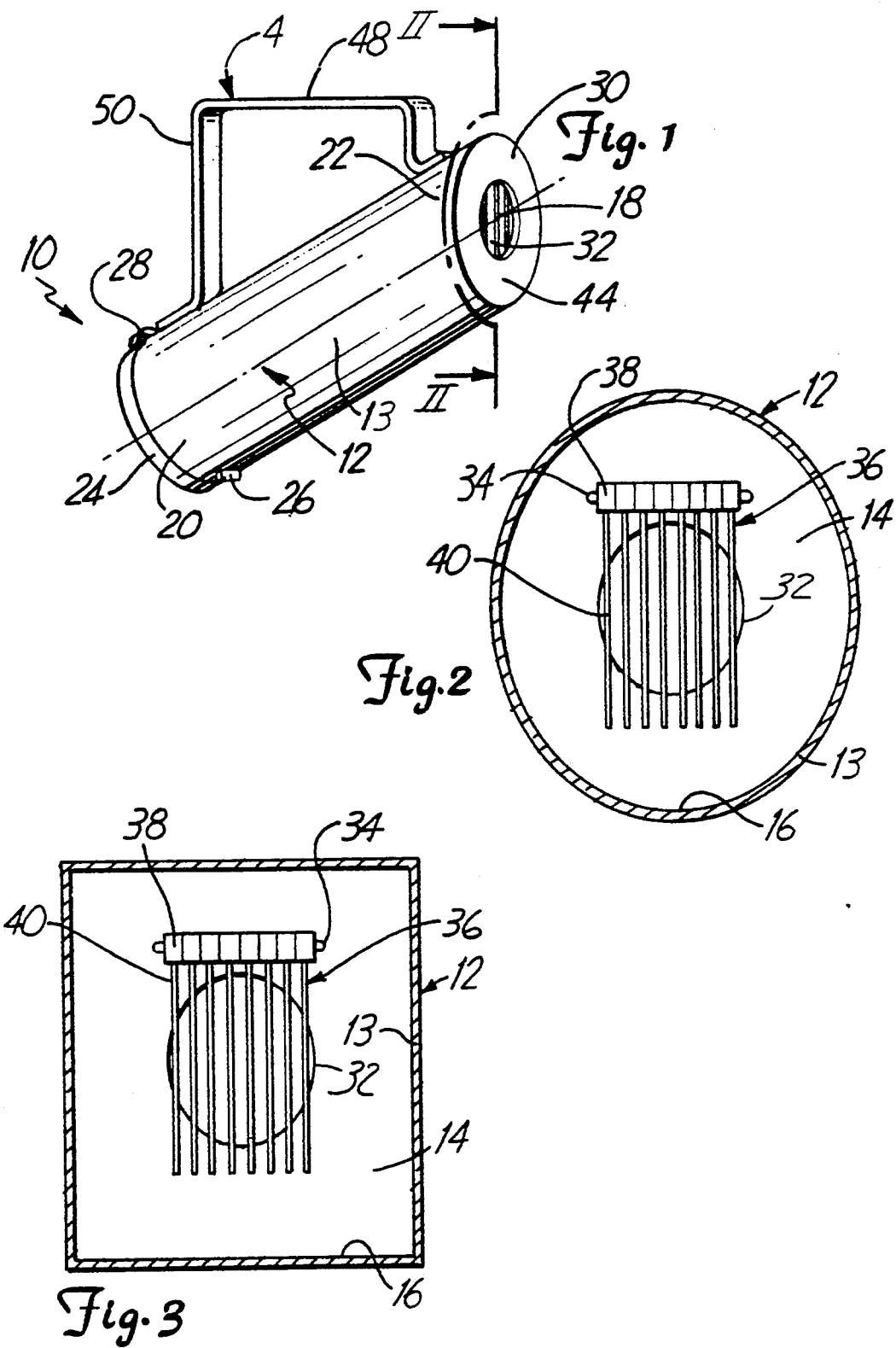

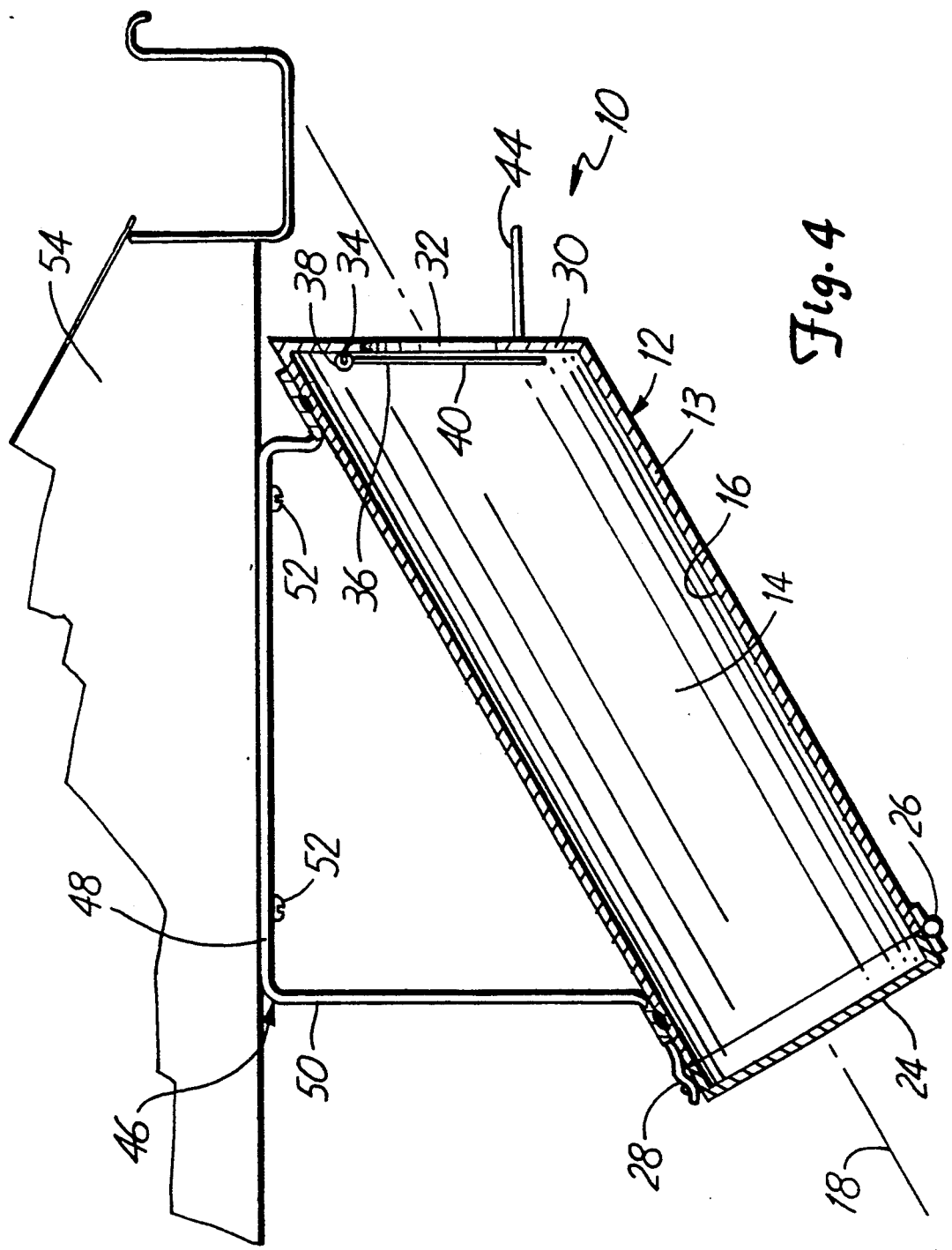

BIRD TRAP ASSEMBLY

BACKGROUND OF THE INVENTION

The present invention related to bird traps and, in particular, it relates to bird traps which trap birds having a natural instinct to nest or roost in darkened places.

Certain birds, such as sparrows and starlings, have a natural instinct to nest or roost in darkened paces. The inside of soffits and overhangs around houses and other buildings generally provide a favored nesting environment for these birds. Once these birds have entered the soffits and overhangs, it is difficult to remove the birds without endangering the lives or health of the birds. However, if the birds are not removed, the birds can cause damage to the structure of the building and create a genuine noisy nuisance for any occupants of the infested buildings.

A variety of bird traps are known in the art. Many bird traps, such as the traps described in the Wood et al U.S. Pat. No. 3,393,468 and the Krenson U.S. Pat. No. 4,779,373, rely on food or bait to entice birds to enter a wire or mesh trap. However, many bait traps lack complete effectiveness since during most of the year, birds have plenty of natural food in their environment. Therefore, many birds do not have the hunger necessary to entice them to enter the trap.

Other traps, such as the trap described in the Boyer U.S. Pat. No. 1,506,045, rely on happenstance to trap the birds. For example, the trap described in the Boyer patent includes a tubular entry positioned in a window. The tubular entry leads to a fabric or mesh container. Spring finger at the end of the tubular entry and adjacent the container prevent birds within the container from gaining access back into the tubular entry.

The Boyer patent teaches that the mesh container should be sufficiently permeable to allow air to flow into the building through the tubular entry. Therefore, the Boyer patent's trap does not rely on the a bird's natural instinct to nest or roost in a darkened area but, instead, birds enter the tubular entry of the trap on mere chance or in search of food. In addition, the birds are only trapped after traveling completely through the tubular entry and entering the container. Anywhere along the tubular entry, such as when the bird realizes that it is not entering a place to feed, the bird could turn around and leave the tubular entry without being trapped.

Still, there are other types of devices which actually remove flying animals, such as bats, from a certain area. The bat elimination device described in the Lafforthun U.S. Pat. No. 4,757,638 includes a tubular passage extending from a house or other building to an outside exit chamber. A perforated door on the exit chamber permits air to flow through the tubular passage. Accordingly, bats enter the tubular passage due to the bat's natural instinct to travel toward the source of an air current. There is no teaching or suggestion within the Lafforthun patent of actually trapping the bat, but only preventing the bat from reentering the house or barn. Unfortunately, since the bat is not immediately prevented from reentering the area upon entry into the tubular passage, the bat could reenter the house or barn once it has reached the exit chamber if the bat would not pass through the doorway.

The traps or elimination devices as described in the above patents do not rely on a bird's natural instinct to nest or roost in darkened areas. In fact, none of the above patents either teach or suggest a darkened area to lure birds to enter and to immediately trap the bird to prevent the bird from escaping the trap or device from the point of original entry.

SUMMARY OF THE INVENTION

The present invention provides a trap assembly for trapping birds which have a natural instinct to nest or roost in dark places. The trap assembly according to the present invention comprises a housing having a closed end and an open end. A darkened area within the housing entices birds to enter the housing through the open end. Trap means immediately adjacent the open end traps the birds within the housing thereby preventing the birds from exiting the housing via the open end.

In a preferred embodiment, the housing is substantially tubular and positioned such that the closed end is at a lower position relative to the open end. Removal means are located at the closed end of the housing for removing the birds trapped within the housing. The trap means includes a plate having an aperture therethrough with the plate covering the open end of the housing and a plurality of parallel spokes hingedly connected to the plate with the spokes being positioned over the aperture. Furthermore, the housing preferably includes means for positioning the housing such that a longitudinal axis of the housing is offset from horizontal about 30 degrees.

BRIEF DESCRIPTION OF THE DRAWINGS

FIG. 1 is a perspective view of the trap assembly of the present invention;

FIG. 2 is a sectional view taken along line 2—2 in FIG. 1;

FIG. 3 is a sectional view of another embodiment of the trap assembly according to the present invention as viewed from the interior of the housing toward the door; and FIG. 4 is sectional view of the trap assembly of the present invention.

DETAILED DESCRIPTION OF THE PREFERRED EMBODIMENTS

FIG. 1 illustrates a trap assembly, designated generally at 10, in accordance with the present invention, for trapping birds, such as sparrows and starlings, which have a natural instinct to nest or roost in darkened places. The trap assembly 10 includes a substantially tubular, elongated housing 12 having a sidewall 13 defining an interior area or space 14.

While it is preferred that the housing 12 be elongated and tubular, the cross-sectional configuration of the housing can be of any preferred shape or configuration. As illustrated in FIG. 2, one embodiment of the housing 12 is illustrated as having a round cross-sectional configuration. As illustrated in FIG. 3, another embodiment of the housing 12 is illustrated as having a rectangular cross-sectional configuration.

In accordance with the present invention to create a darkened environment for attracting birds which have a natural instinct to nest or roost in such area, the housing 12 is preferably constructed of a substantially light-impermeable material which lends itself to be easily formed into a tubular-like structure, i.e., aluminum or other metal. However, it is within the scope of the present invention to construct the housing 12 from any type of substantially light-impermeable material, i.e., plastic, if so desired.

As illustrated in FIG. 1, the housing 12 includes a substantially smooth interior surface 16, a longitudinal axis 18 along the elongated length of the housing 12, a first end 20 and a second end 22. The first end 20 of the housing 12 is preferably truncated along a plane substantially perpendicular to the longitudinal axis 18 of the housing 12. The second end 22 of the housing 12 is preferably truncated along a plane offset approximately 40 degrees from the longitudinal axis 18. While the various truncated angles described actually facilitate in creating a darkened area within the housing 12 to entice birds to enter the housing 12 as will be described below, it is within the scope of the present invention for the first end 20 and the second end 22 to 1) have varied truncation angles different from the angles discussed above, and 2) to have the same truncation angle so long as a darkened interior area within the housing 12 is created.

As illustrated in FIG. 4, a light-impermeable door 24 is hingedly attached to the sidewall 13 of the housing 12 at the first end 20. Preferably, the door 24 has approximately the same cross-sectional configuration of the housing 12 such that no light, or only a small amount of light, enters the housing 12 through the first end 20 between the door 24 and the sidewall 13. The door 24 includes a hinge 26 attached to the sidewall 13 and a latch 28 opposite the hinge 26 to facilitate opening and closing the door 24. The latch 28 is designed to releasably secure the door 24 to the sidewall 13 of the housing 12 such that the door 24 can be securely closed so a bird within the housing 12 can not open the door 24 in addition to the door 24 being capable of being opened and closed about the hinge 26.

The door 24 is preferably constructed of the same substantially light-impermeable material as the housing 12, i.e., aluminum or other metal. However, it is within the scope of the present invention to construct the door 24 of a material different from the housing 12, i.e., wood or plastic, if so desired.

As illustrated in FIG. 1, the trap assembly 10 further includes a plate 30 positioned at the second end 22 of the housing 12. The plate 30 is attached to the sidewall 13 of the housing 12 by suitable fastening means, i.e., welding, such that no light, or only a small amount of light, enters the housing 12 between the plate 22 and the sidewall 13.

The plate 30 is preferably constructed of the same substantially light-impermeable material as the housing 12 and the door 24, i.e., aluminum or other metal. However, it is within the scope of the present invention to construct the plate 30 of a material different from the housing 12 and the door 24, i.e., wood or plastic, if so desired.

The plate 30 includes an aperture 32 extending through the approximate center of the plate 30. The aperture 32 is sufficiently sized to allow sparrows, starlings and other small birds which have a natural instinct to nest or roost in darkened areas to enter the housing 12 through the aperture 32. In the preferred embodiment, the aperture 32 has a diameter of approximately two inches. It is within the scope of the present invention, however, to have an aperture which is rectangular, oval or other configuration.

As illustrated in FIG. 2, a crossbar 34 is mounted on the plate 30 within the interior 14 of the housing 12. The crossbar 34 carries a plurality of parallel, narrow spoke members 36. Each spoke member 36 includes a spacer portion 38 and a post portion 40 extending from each spacer portion 38. The spacer portions 38 maintain a predetermined distance between each of the post portions 40; the spacing being determined by the length of the spacer portions 38.

Each spacer portion 38 is a substantially cylindrical, hollow body with the crossbar 34 extending completely through the spacer portion 38. The inside diameter of the spacer portion 38 is greater than the diameter of the crossbar 34 such that the spacer portion 38 can rotate freely about the crossbar 34. Free rotation of the spacer portion 38 about the crossbar 34 allows gravity to maintain the post portions 40 substantially perpendicular to the horizontal and directly over the aperture 32 of the plate 30 when the longitudinal axis 18 of the housing 12 is offset approximately 30 degrees from the horizontal (such as when the second end 22 of housing 12 is at a relative position equal to or above the first end 20 of the housing 12).

In the preferred embodiment, the length of each of the spacer portions 38 is approximately one-half inch. However, any length spacer portion 38 is within the scope of the present invention so long as the distance between each post portion 40 is sufficient to prevent a bird trapped within the housing 12 from escaping between the post portions 40. Likewise, a minimum spacer portion 38 length, i.e., one-eighth inch, must be maintained so that the distance between each post portion 40 sufficiently allows any birds desiring to enter the housing 12 to view the darkened interior of the housing 12. It should be noted that the maximum and minimum spacer portion length is dependent on the size of the bird to be trapped.

Each post portion 40 is constructed of a substantially rigid material to restrict any bending or deflection of the post portions 40. The post portions 40 according to the present invention must have a length sufficient to extend from the spacer portion 38 to a point beyond the aperture 32 thereby covering the aperture 32. Therefore, at least some of the post portions 40 will need to have a length greater than the diameter of the aperture 32. By maintaining the post portion length such that it extends across the aperture 32, the spoke members 36 can only rotate toward the interior 14 of the housing 12 and the post portions 40 can not pass outward through the aperture 32. Eliminating outward rotation of the spoke members 36 will trap a bird within the housing 12 and keep the bird from escaping through the aperture 32.

The spoke members 36 can be constructed from any substantially rigid, lightweight material, such as metal or plastic, to inhibit the spoke members 36 from bending or otherwise being deformed as the birds contact the spoke members 36 either entering or attempting to leave the housing 12. In one embodiment of the present invention, the spacer portion is constructed from a small copper pipe cut in one-half inch lengths with galvanized iron post portions welded to the spacer portion. In yet another embodiment of the present invention, the spacer portions and post portions are integral to one another and are integrally molded from plastic.

In another embodiment of the present invention, perch or ledge 44 is mounted to the plate 30 outside the housing 12 and below the aperture 32. The ledge 44 allows birds to land or otherwise stop before entering the housing 12 through the aperture 32. The ledge 44 can be of any known construction and is preferably dimensioned such that a bird considers the ledge 44 to be a safe resting place such that the bird can safely and comfortably land thereon prior to entering the interior 14 of the housing 12 through the aperture 32.

As illustrated in FIG. 4, a mounting support 46 is attached to the housing 12 to position the housing 12 whereby the first end 20 is at a point lower than the second end 22 and the longitudinal axis 18 of the housing 12 is angled approximately 30 degrees from the horizontal. The mounting support 46 includes a horizontal support 48 and a vertical support 50. To angle the longitudinal axis 18 of the housing 12 as described, the horizontal support 48 will preferably have a length greater than the length of the vertical support 50.

The vertical support 50 is attached to the housing 12 at the first end 20. The horizontal support 48 is attached to the housing 12 at the second end 22. The mounting support 46 can be constructed of any known material, i.e., wood or metal, and is attached to the housing 12 in any known fashion. In the preferred embodiment, the mounting support 44 is metal and is welded to the housing 12.

The mounting support 44 further includes a plurality of mounting apertures (not shown) through which screws 52 extend to mount the housing 12 to an overhang 54. It should be noted that in the preferred mounting position, the second end 22 of the housing 12, having been truncated at 30 degrees as described above, is now perpendicular to the horizontal. Mounting the housing 12 such that the longitudinal axis 18 of the housing 12 is angled approximately 30 degrees from the horizontal allows a bird to look or fly directly horizontal into the aperture 32 of the plate 30 without being able to view the entire interior of the housing 12. The bird only views a darkened housing interior 14 and believes that it can safely nest or roost within the housing 12.

In operation, a bird which has a natural instinct to nest or roost in darkened areas will search for a place to nest or roost and will observe the trap assembly 10 of the present invention mounted under an overhang 54. As the bird views the trap assembly 10, the bird will either land on the ledge 44 or "fly by" and further view the interior 14 of the housing 12 through the aperture 32. It is envisioned that the bird will notice that the interior 14 of the housing 12 is darkened due to the trap assembly's 10 unique construction. In fact, by positioning the first end 20 of the housing 12 at a position lower relative to the second end 22, any light directly reaching the first end 20 would not be observed by a bird looking directly horizontal into the aperture 32. Additionally, having the plane of the second end 22 substantially perpendicular to the horizontal further obstructs the bird's view into the housing 12 such that it is difficult, if not impossible, for the bird to determine the length of the housing 12. The bird will only observe that the interior 14 of the housing 12 is darkened and, based on the bird's natural instinct, the bird will want to enter the housing 12 in order to nest or roost.

Once the bird has made the determination to enter the trap assembly 10, the bird begins to pass through the aperture 32 and contacts the post portions 40 of the spoke members 36. The bird will not be hindered by the spoke members 36 on the account that the spoke members 36 are constructed of a sturdy, lightweight material, and are mounted to the crossbar 34 to rotate freely toward the interior of the housing 12. Once the bird has passed completely through the aperture 32 and clears the post portions 40 of the spoke members 36, gravity will cause the post portions 40 of the spoke members 36 to fall back against the plate 30 into a closed position such that the spoke members 36 once again hang substantially perpendicular to the horizontal as illustrated in FIG. 4.

Sometime after entering the trap assembly 10, the bird will realize that it is trapped. The bird will then attempt to escape the trap assembly 10. With the door 24 at the first end 20 being latched closed, the bird will try to escape captivity through the aperture 32. However, since the post portions 40 of the spoke members 36 have a length sufficient to cover the aperture 32, the plate 30 will prevent the spoke members 36 from rotating and the bird will not be able to pass through the aperture 32. In addition, the spacer portions 38 of the spoke members 36 will maintain the spacing of the post portions 40 at a predetermined distance, a distance too narrow for the bird to pass between the post portions 40 of the spoke members 36, thereby totally blocking all escape avenues.

Since the interior surface 16 of the housing is substantially smooth, the bird will have to fly in order to get to the level of the aperture 32. Soon, the bird will tire and fall harmlessly to the first end 22 (the lower end) of the housing 12 and lay against the door 24. In this position, the bird is out of sight and other birds will not be discouraged from entering the trap assembly 10. The trap assembly 10 can be checked periodically to remove the trapped birds and to safely transport the birds to a different location.

The trap assembly 10 of the present invention humanely traps annoying and potentially damaging birds without serious harm to the birds. The birds can be safely removed from populated areas so the birds will not inflict further, and potentially costly, damage.

Although the present invention has been described with reference to preferred embodiments, workers skilled in the art will recognize that changes may be made in form and detail without departing from the spirit and scope of the invention.

What is claimed is:

1. A trap assembly for trapping birds which have a natural instinct to nest or roost in dark places, the trap assembly comprising:

a housing having a closed end and an open end truncated along a first plane angularly offset from a longitudinal axis of the housing, the housing being constructed of a light impermeable material such that a darkened area is created within the housing such that the birds are enticed to enter the housing through the open end;

trap means immediately adjacent the open end for trapping the birds within the housing thereby preventing the birds from exiting the housing via the open end; and mounting means attached to the housing for mounting the trap assembly at an angle above the ground surface with the closed end closer to the ground surface that the open end.

2. The trap assembly of claim 1 wherein the housing is substantially tubular.

3. The trap assembly of claim 2 wherein the housing is substantially cylindrical.

4. The trap assembly of claim 2 wherein the housing has a rectangular cross-sectional configuration.

5. The trap assembly of claim 1 wherein the first plane is offset from the longitudinal axis approximately 60 degrees.

6. The trap assembly of claim 1 and further including removal means at the closed end of the housing for removing the birds trapped within the housing.

7. The trap assembly of claim 6 wherein the removal means includes a door attached to the housing.

8. The trap assembly of claim 1 wherein the trap means includes a plate having an aperture therethrough, the plate covering the open end, and further including a plurality of parallel spokes hingedly connected to the plate, the spokes being positioned over the aperture.

9. The trap assembly of claim 8 wherein the trap means further includes at least one spacer attached to each spoke to maintain a predetermined distance between each adjacent spoke.

10. A trap for trapping birds, the tap comprising:
a tubular housing having a first end and a second end;
a door covering the first end of the housing, the door blocking light from entering the housing through the first end, the door and the housing crating a darkened area within the housing;
a plate member covering the second end of the housing, the plate member having an aperture sufficiently sized for allowing birds to enter the housing;
trap means immediately adjacent the aperture for trapping the birds upon the bird's entry into the housing; and
mounting means attached to the housing for mounting the trap assembly at an angle above the ground surface with the closed end closer to the ground surface than the open end.

11. The trap of claim 10 wherein the trap means includes a plurality of parallel spokes hingedly connected to the plate, the spokes being positioned over the aperture.

12. The trap assembly of claim 10 wherein the trap means further includes at least one spacer attached to each spoke to maintain a predetermined distance between each adjacent spoke.

* * * * *

UNITED STATES PATENT AND TRADEMARK OFFICE
CERTIFICATE OF CORRECTION

PATENT NO. : 5,325,622
DATED : July 5, 1994
INVENTOR(S) : Dwain H. Merickel

It is certified that error appears in the above-indentified patent and that said Letters Patent is hereby corrected as shown below:

```
Title page, item [57], Abstract:  line 1, after "have", insert --a--.
Column 1, line 33, delete "finger", insert --fingers--.
Column 2, line 63, delete "area", insert --areas,--
Column 3, line 11, delete "40 degrees", insert --60 degrees--.
Column 6, line 60, delete "that", insert --than--
Column 7, line 19, delete "tap", insert --trap--
Column 8, line 1, delete "crating", insert --creating--
```

Signed and Sealed this

Eleventh Day of October, 1994

Attest:

BRUCE LEHMAN

*Attesting Officer*          *Commissioner of Patents and Trademarks*